Oct. 5, 1971    A. H. BELLOWS    3,610,128
STEREO RANGEFINDER
Filed April 30, 1970    3 Sheets-Sheet 3

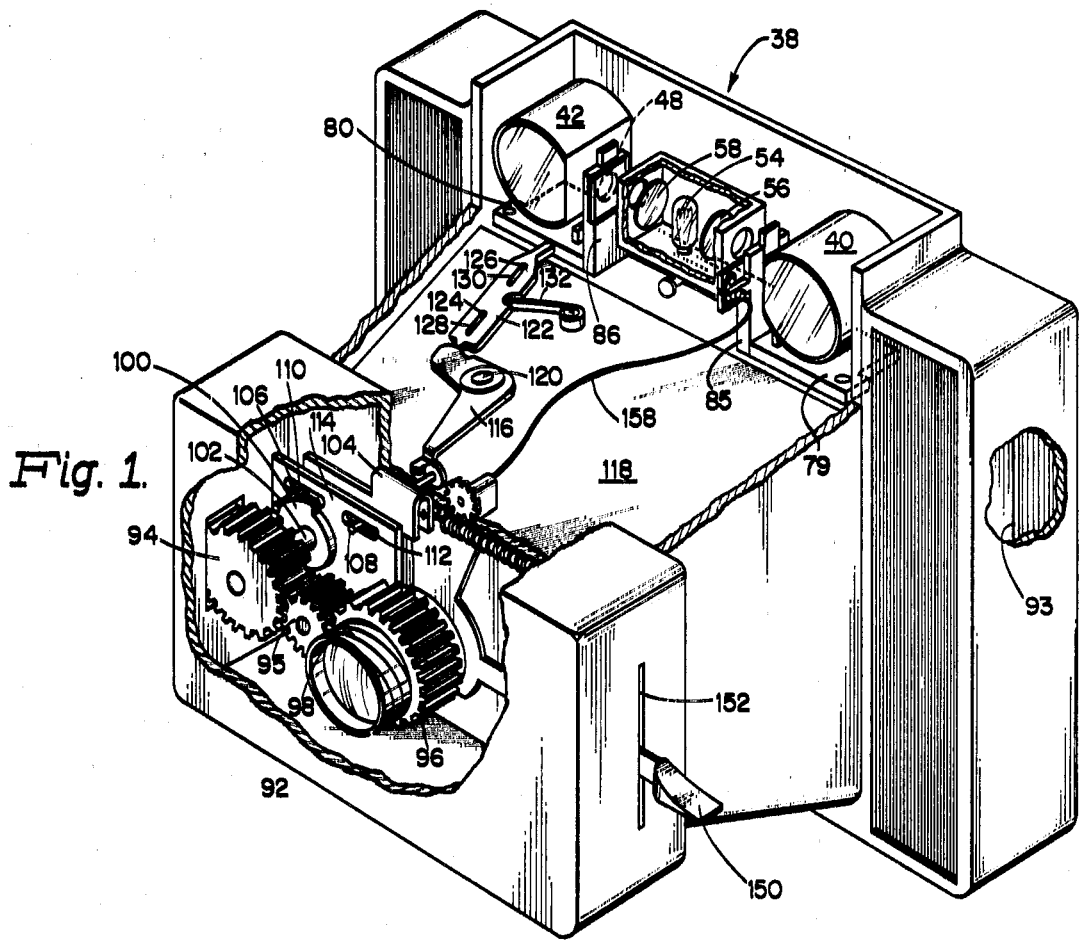

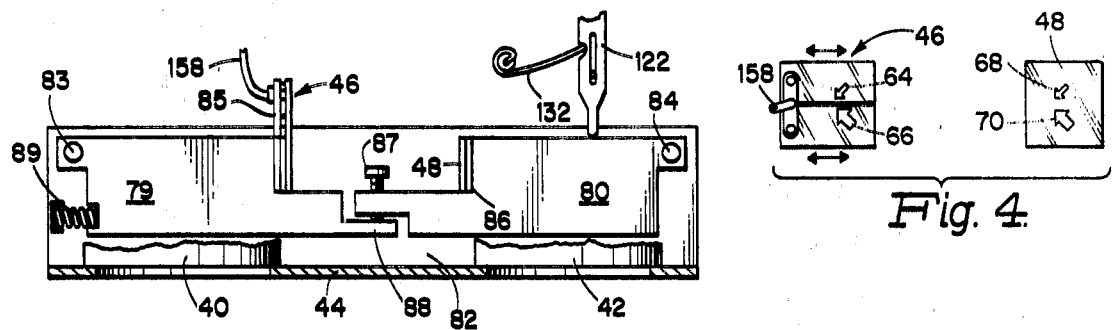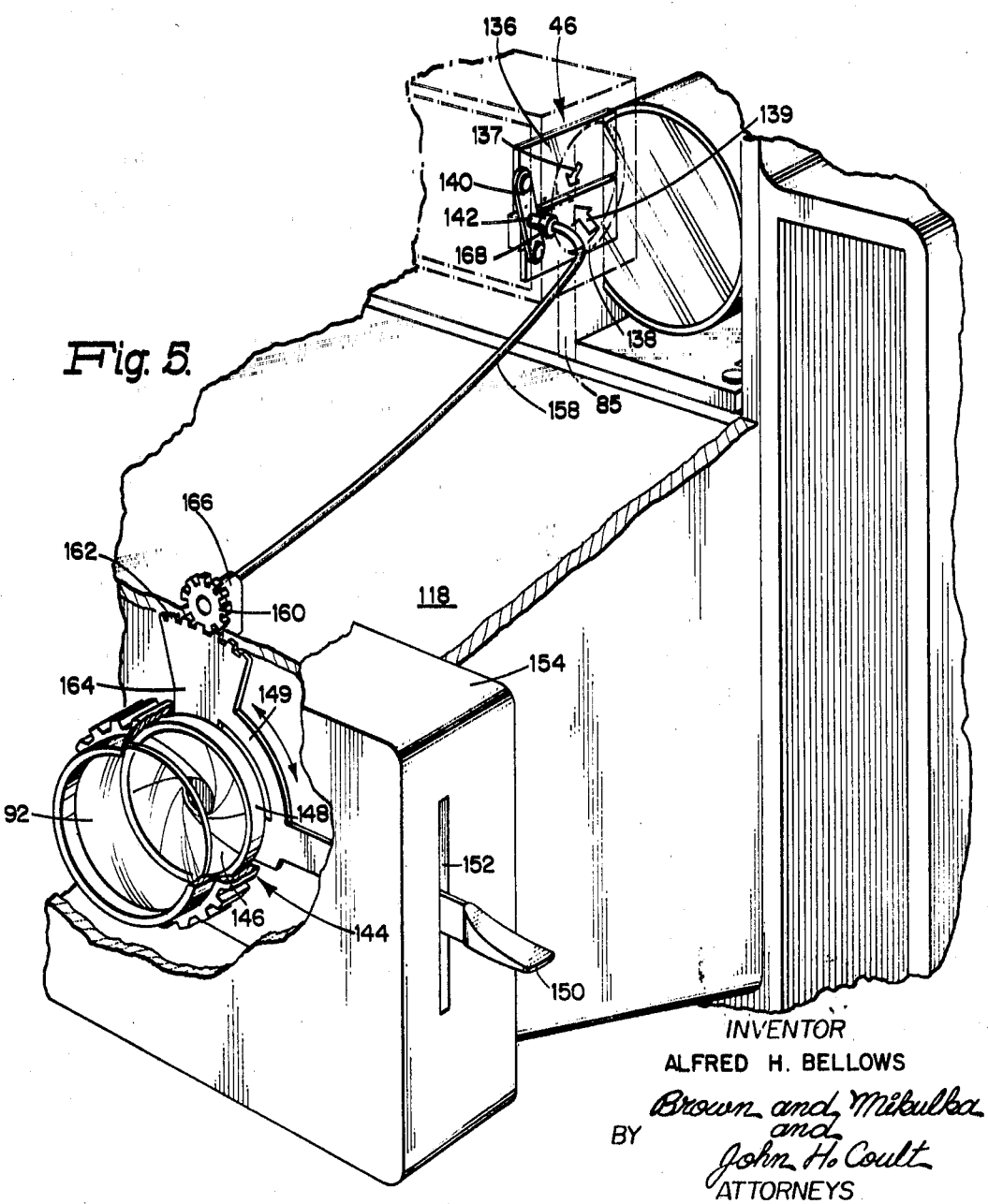

INVENTOR
ALFRED H. BELLOWS
BY Brown and Mikulka
and
John H. Coult
ATTORNEYS

United States Patent Office 3,610,128
Patented Oct. 5, 1971

3,610,128
STEREO RANGEFINDER
Alfred H. Bellows, Cambridge, Mass., assignor to
Polaroid Corporation, Cambridge, Mass.
Filed Apr. 30, 1970, Ser. No. 33,246
Int. Cl. G03b 3/00; G01c 3/14
U.S. Cl. 95—44 C                    7 Claims

ABSTRACT OF THE DISCLOSURE

A photographic camera incorporates a stereo rangefinder responsive to focus and aperture adjustments of the camera objective lens. The rangefinder includes stereoscopically related left and right reticles and means for projecting virtual images of the reticles a like distance along convergent left and right stereo axes to create a binocularly observable three-dimensional reticle image which appears to be located at the point of convergence of the stereo axes. Means are shown for selectively causing the stereo image to recede or advance in the viewed field in correspondence with changes in the focused distance of the camera objective lens. The near and far limits of the stereo image embrace those objects in the viewed field which are in focus; the separation of the near and far limits indicates the depth of field of the objective. The magnitude of the depth-wise extension of the stereo image, i.e., the apparent separation of the near and far limits of the stereo image, is caused to vary with adjustments of the lens effective aperture such that the depth of field indicated by the stereo image takes into effect depth of field changes induced by lens aperture adjustments. The variation in the apparent magnitude of the depth-wise extension of the stereo image is accomplished by adjusting the relative stereo viewpoints represented by the left and right stereo reticles.

CROSS-REFERENCE TO RELATED APPLICATION

This application relates to but is not dependent upon a copending application of E. H. Land and Alfred H. Bellows, Ser. No. 830,266, filed June 4, 1969, assigned to the assignee of the present invention.

BACKGROUND OF THE INVENTION

The above-identified copending application discloses and claims a novel rangefinder concept in which a virtual stereo image is projected into the observed field. The rangefinder is shown embodied in a photographic camera in which adjustment of a variable focus objective lens causes the stereo image to "track" (follow) the focus of the lens. By locating the stereo image such that the object to be photographed falls within the limits of the depth-wise extension of the stereo image, the proper focus setting for the lens is automatically established.

This invention in a broad sense relates to stereoscopy; as disclosed specifically herein it relates to a coupled photographic stereo rangefinder which takes into effect variations in the depth of field of a camera objective lens resulting from changes in its effective aperture. In the rangefinder set forth in the said copending application, no provision is made for variations in depth of field caused by aperture adjustments.

OBJECTS OF THE INVENTION

It is an object of this invention to provide an improved stereo rangefinder in which the the depth-wise extension of the projected stereo image is selectively adjustable.

It is another object to provide a photographic camera having an improved coupled stereo rangefinder which provides a visual indication of depth of field variations as a function of adjustments in effective aperture of the camera objective lens.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein:

FIG. 1 is a perspective view of a photographic camera incorporating a novel coupled rangefinder constructed in accordance with this invention;

FIG. 2 is a schematic top (plan) view of the optical system for the rangefinder embodied in the FIG. 1 camera;

FIG. 3 is a fragmentary top (plan) view of support structure for the rangefinder reticles illustrated in FIGS. 1 and 2;

FIG. 4 is a schematic front elevational view of left and right reticles which may be employed to carry out the teachings of this invention;

FIG. 5 is an enlarged fragmentary perspective view of a portion of the FIG. 1 camera, illustrating in more detail apparatus for changing the relative stereo viewpoints represented by the left and right reticles, and the manner in which the rangefinder is coupled to the aperture control for the camera such that adjustments in the effective aperture of the camera objective lens, and thus in the depth of field thereof, effect variations in the apparent magnitude of the depth-wise extension of the stereo virtual image projected by the rangefinder;

FIG. 12 schematically illustrates an alternative embodiment for carrying out the teachings of this invention.

DESCRIPTION OF THE PREFERRED EMBODIMENTS

FIGS. 1–5 illustrate a photographic camera incorporating a projected image stereo rangefinder implementing the principles of this invention. Before undertaking a detailed discussion of the novel rangefinder and the manner in which it may be incorporated into a photographic camera, a brief description of the principles involved in a projected image stereo rangefinder will be engaged (see FIGS. 6–10).

Figure 6:
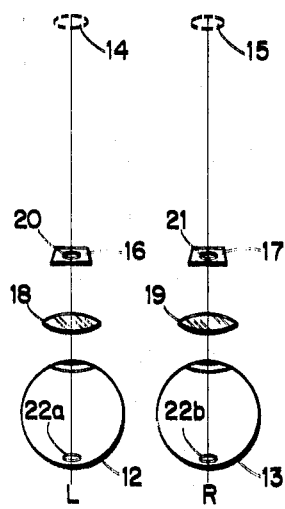
FIGS. 6–10 illustrate the general principles involved in a projected image stereo rangefinder.

FIG. 6 illustrates the left and right eyes 12, 13 of an observer viewing virtual images 14, 15 of left and right reticles 16, 17 projected to infinitely by left and right eye lenses 18, 19 located a focal length away from the reticles 16, 17. The reticles 16, 17 here shown might, for example, be merely clear glass slips with circular yellow wratten filters 20, 21 attached thereto. It is seen that the left and right retinal images 22a, 22b formed in the left and right eyes of the observer are identical in size and retinal location—thus the observer would perceive a single yellow disc at infinity.

Figure 7:
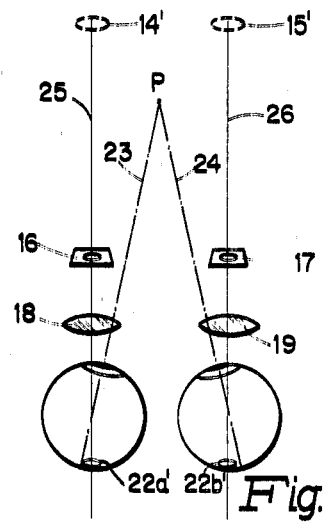

FIG. 7 illustrates the same general layout as FIG. 6 except that the eyes 12, 13 have been rotated inwardly such that the occular axes 23, 24 converge at a point P in space. In this situation, the retinal images 22a', 22b' of the reticles 16, 17 appear at different retinal locations in the left and right eyes. Thus, the observer sees a double image consisting of two yellow discs 14', 15' separated in space at infinity.

Figure 8:
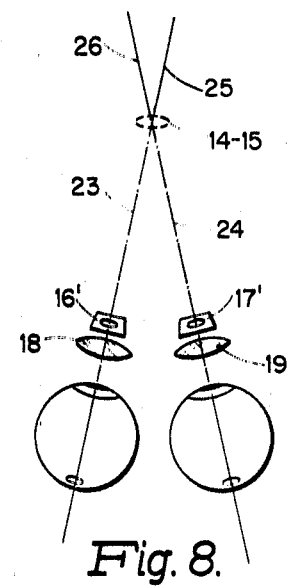

FIG. 8 illustrates the effect of rotating the left and right reticle projection axes 25, 26, sometimes hereinafter termed left and right stereo axes, to coincide with the ocular axes 23, 24. When this condition is met, the observer sees a single three-dimensional reticle image 14–15 which appears to be located at the convergence point of the axes. It is desirable in order to prevent eye strain to locate the projected reticle image for each eye at this convergence point. This enables the observer to easily focus on both the stereo image and on objects in the viewed field near the stereo image. To this end, FIG. 8 shows the reticles 16', 17' moved in appropriately closer to the eye lenses 18, 19 to cause the stereo image to appear at the intersection of the ocular and stereo axes.

Figure 9:
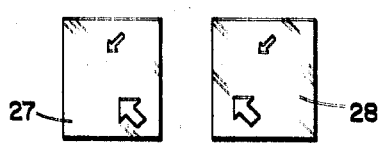
Figure 10:
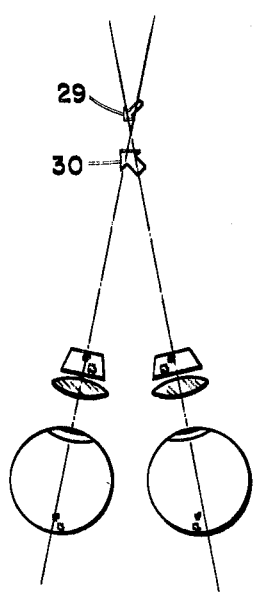

In accordance with this invention, the reticles are stereoscopically related pairs (stereo pairs) and represent views of a three-dimensional object observed from two different perspectives, sometimes herein termed "stereo viewpoints." If left and right reticles as shown at 27 and 28 in FIG. 9 are substituted for the reticles 16', 17' in FIG. 8, the observer will see a three-dimensional stereo image appearing as two arrows 29, 30 having a depth-wise separation in the viewed field.

In accordance with the invention described and claimed in the above-identified copending application, the image distance of the projected reticle images and the convergence of the projection axes are varied in concert to cause the stereo image to advance or recede in the viewed field until the stereo image appears to correspond generally in space with the location of an object whose range is to be determined. The setting of the range-finder when this correspondence occurs is identified with the range of that object. In the said copending application the rangefinder is embodied in a photographic camera. The depth-wise movement of the projected stereo image is caused to be responsive to adjustments of a focus control mechanism for the camera such that when a subject to be photographed is located within the depth-wise extension of the stereo image, the subject is within the depth of field of the camera objective (for a given lens aperture).

In all but the simplest cameras, means are provided for varying the effective exposure aperture of the camera objective. As is well known, the depth of field of a lens varies substantially with changes in effective aperture. In a rangefinder of the type described in the said copending application, the near and far limits of the projected stereo image preferably indicate for all conditions the depth of field of the camera objective. It is a stated object of this invention to provide means for causing the apparent depth-wise extension of the projected stereo image to vary in accordance with changes in the effective aperture of the camera objective. To this end, means and methods are shown for varying the apparent separation between the stereo viewpoints represented by the left and right reticles to thus create in the mind of the observer the impression that the depth-wise extension of the stereo image is varied.

It is well known from the general principles of stereoscopy that the magnitude of the lateral change in object location or object separations when comparing left and right stereo pairs determines the degree of stereoscopic perception of depth. Objects nearer the observer will have greater lateral displacement between stereo pairs than objects more distant from the observer.

Figure 11:
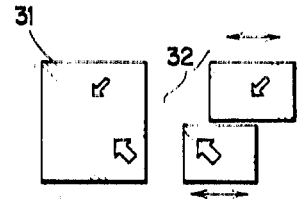
FIG. 11 illustrates schematically the manner in which the apparent separation between the stereo viewpoints represented by the left and right reticles may be varied in accordance with this invention.

Numerous ways are contemplated for causing an apparent change in the stereo viewpoints—FIG. 11 schematically illustrates one. FIG. 11 shows left and right reticles 31, 32. The right reticle 32 includes components 32a, 32b movable laterally relative to each other. As explained in detail hereinafter, lateral relative displacement of the components 32a, 32b varies the apparent lateral separation between the left and right stereo viewpoints.

With the above-discussed principles in mind, the FIGS. 1–5 embodiment will be readily comprehended.

The FIGS. 1–5 camera incorporates a novel stereo rangefinder embodying the principles of this invention. The disclosed implementation of the rangefinder concepts is shown as comprising a pair of left and right eyepieces 40, 42 affixed to the rear wall 44 of the rangefinder housing for viewing left and right reticles 46, 48. In accordance with the invention described and claimed in the above-described copending application, the reticles 46, 48 are stereo pairs, representing different perspective views of a three-dimensional object (see FIG. 4, to be discussed in detail below).

Referring especially to FIG. 2, a pair of like optical projection systems are provided for projecting virtual images of the left and right reticles 46, 48 along left and right projection (or "stereo") axes 50, 52 for viewing by the left and right eyes of the observer. The optical projection systems comprise a common light source, here shown as a battery-energizable incandescent lamp 54, diffusely illuminating reticles 46, 48 through collimating lenses 56, 58 and diffusers 60, 62.

The reticles 46, 48 may be constructed as shown in FIG. 4 in the form of opaque masks having pairs of arrow-shaped windows 64, 66, and 68, 70, respectively.

Each of the eyepieces 40, 42 comprises a glass block having in cemented relationship a forward element 72, an outer rear element 73 and an inner rear element 74. The interface between the front element 72 and the rear elements 73, 74 is spherical and semi-reflective to define a concave spherical mirror 75. The interface between rear elements 73, 74 is planar and partially mirrorized to define a beamsplitter 76 oriented at 45° to the projection axes 50, 52.

The beamsplitter 76 in each of the virtual image projection system acts to deflect an image of the back-lighted reticle windows forwardly along the projection axes 50, 52. The negative mirrors 75 see the reticles as being located in the positions 78. The nominal distance from the reticles 46, 48 to the respective mirrors 75 is chosen to be equal to or somewhat less than the focal length of the mirrors 75. The mirrors 75 thus project a virtual image of the respective reticles to or near infinity.

Also in accordance with the rangefinder invention set forth in the copending application, in order to enable the user to vary the apparent depth-wise location of the stereo image in the viewed field, means are provided for varying the convergence angle $\theta$ between the projection axes 50, 52 and also for varying the image distance of the projected left and right reticle images.

The means for implementing such a concurrent adjustment of the convergence angle of the stereo axes and the image distance of the stereo image may take numerous structural forms. In the disclosed embodiment this end is achieved by effecting relative motion of the reticles 46, 48 with respect to the eyepieces 40, 42. Referring particularly to FIG. 3, the reticles 46, 48 are supported on horizontal plates 79, 80 which are in turn connected to the bottom wall 82 of the rangefinder housing by pins 83, 84 which permit rotation of the plates 79, 80 in a horizontal plane. The reticles 46, 48 are carried on arms 85, 86 extending vertically from the plates 79, 80.

An adjustable screw 87 on the right plate 80 engages a projection 88 on the left plate 79 to cause the plate 79 to follow counterclockwise movement of plate 80. A compression spring 89 acting on plate 79 causes plate 79 to follow clockwise movement of the plate 80 and maintains tension between the plates 79, 80.

Rotation of the plates 79, 80, and thus the reticles 46, 48 cause the reticles 46, 48 to move relative to the eyepieces 40, 42 for example to the positions 90 shown in skeleton lines in FIG. 2, thus changing the reticle object distance and accordingly the image distance of the left and right reticle images. Further, rotation of the plates 79, 80 causes the reticle images to move transverse to the optical axis of the eyepieces 40, 42, thus rotating the projection axes 50, 52 to the positions shown at 50', 52'. Note that the directions of movement of the convergence point of the axes 50, 52 and of the stereo image distance are in a corresponding sense.

As taught by the said copending application, movement of the stereo reticle image may be coupled in the focus control mechanism of a variable focus objective lens in a photographic camera. In FIGS. 1–5 the camera is illustrated as including a variable focus objective lens 92 for forming an image of a photographed scene on a sheet of photosensitive film 93. In the disclosed embodiment, a focus control mechanism for adjusting the focused distance of the variable focus lens 92 is shown as comprising a rotary actuator 94 having gear teeth. Rotation of the actuator 94 by the operator drives an idler gear 95 which in turn meshes with gear teeth 96 on a rotatable lens barrel 98. Thus, rotation of the actuator 94 causes a change in the focus setting of the lens 92. The lens barrel 98 and associated lens support and drive structure is of a conventional design of the type wherein rotation of the lens barrel 98 reciprocates the lens 92 along its optical axis.

As explained in some detail above, it is desirable to have the rangefinder 38 coupled to the variable focus lens 92 such that the focus setting of the lens 92 follows the range distance indicated by the rangefinder. In the disclosed embodiment this correspondence is achieved by causing the movable plate 80 (and thus the right reticle 48) to rotate as the actuator 94 is rotated to change the focus of lens 92.

In accordance with the invention set forth in the said copending application, means for coupling the lens 92 and the plate 80 may take the form of a coupling mechanism comprising a radial cam 100 on a common shaft 102 with the rotary actuator 94. The cam 100 drives a slide 104 constrained to linear motion by a cam follower pin 106 and a guide pin 108 captured by slots 110, 112, respectively, in a support member 114. Linear motion in the slide 104 is translated into angular motion in a bell crank lever 116 pinned to an upper wall 118 of the camera exposure chamber by a pin 120. Angular motion of the lever 116 is converted back into linear motion by a sliding member 122 constrained to linear motion by the effect of a pair of pins 124, 126 extending from the chamber upper wall 118 and captured by slots 128, 130 in sliding member 122. A leaf spring 132 and coil spring 134 maintain tension in the coupling mechanism.

It is manifest from FIG. 1 and the above discussion that rotation of the actuator 94 in a counterclockwise direction (in FIG. 1) will cause the stereo reticle image to recede from the observer. The lens support is selected to be of the type that counterclockwise rotation (in FIG. 1) of the barrel 98 causes the lens to move rearwardly so as to focus on more remote objects.

As discussed briefly above, changes in the effective aperture of a camera objective lens produce substantial variations in the depth of field of the lens, i.e., in the separation of the near and far limits of the scene objects "in focus." It is a stated object of this invention to couple a projected image stereo rangefinder to a photographic camera such that the depth-wise extension of the stereo image is caused to vary in correspondence with depth of field variations of the associated camera objective resulting from changes in its effective aperture.

As discussed above, especially in connection with FIG. 11, the magnitude of the lateral shift in the location of common elements in left and right stereo pairs is interpreted by the observer in terms of the magnitude of separation distance between the elements.

This invention exploits the described physiological phenomena to cause the depth-wise extension of the projected stereo images to be selectively variable. This is accomplished in the disclosed embodiment by separating the left reticle 46 into two components movable relative to each other. (See FIGS. 4 and 5.) An upper reticle component 136 defines a window 137 in the shape of a small arrow; the lower reticle component 138 defines a window 139 in the shape of a larger arrow. The arrow configurations correspond to those in the right reticle 48.

In order to introduce a relative lateral displacement of the arrows in the left and right reticles 46, 48 and thereby effect apparent changes in the magnitude of the depth-wise extension of the stereo image, the reticle components 136, 138 are mounted so as to be translatable in a parallel but opposite sense. In the disclosed embodiment means for carrying out this parallel but opposite translational movement of the reticle components 136, 138 is shown as comprising a linkage 140 affixed to a shaft 142 mounted for rotation on the arm 85. The linkage 140 is pinned at one end to the reticle component 136 and at the other end to the component 138 whereby rotation of the shaft 142 causes the upper and lower reticle components 136, 138 to translate in parallel but opposite directions.

It is an object of this invention to cause variations in the apparent magnitude of the depth-wise extension of the projected stereo image to accord with changes in the depth of field of the objective lens 92 resulting from adjustments in its effective aperture. Referring particularly to FIGS. 1 and 5, the disclosed camera embodiment is illustrated as including a variable diaphragm 144 of the iris type having a plurality of angularly overlapped diaphragm blades 146. The diaphragm 144 is of a conventional type wherein the blades are adjustable together by rotation of a manual control element, here shown in the form of a ring 148 connected to and operable by an aperture control member 149. This aperture control member 149 includes a radial lever 150 extending through a slot 152 in a side wall of the front assembly housing 154.

In order to couple the rangefinder 38 and aperture control member 149 such that the separation of near and far limits of the stero image, defining its "depth-wise extension," follows changes in the depth of field of the lens 92, a coupling mechanism is provided. Although numerous other arrangements are contemplated, in the disclosed embodiment the coupling mechanism is shown as including as a primary element a cable 158.

Means for rotating the cable 158 in response to adjustments in effective aperture are shown as comprising a spur gear 160 driven by gear teeth 162 on an arm 164 extending from control member 149. A cable connector 166 joins the gear 160 and the cable 158. A second connector 168 at the opposite end of the cable 158 connects the cable with the rotatable mounted shaft 142 affixed to the linkage 140.

It is easily understood from FIG. 5 that adjustments in the angular position of the lever 150 will effect rotation of the cable 158 and therefore cause angular movement of the shaft 142. As explained above, angular movement of the shaft 142 causes lateral shifts in the relative positions of the arrow-shaped windows 137, 139 and thus in the apparent depth-wise extension of the stereo image.

Assuming that variable diaphragm 144 is constructed and arranged such that clockwise rotation of the ring 148 (in FIG. 5) closes the iris, it is readily evident that downward movement of lever 150 to stop down the lens 92 will increase the relative lateral displacement of the arrow pairs in the stero pairs of reticle images, as they appear on the retina of the observer's left and right eyes, to create the impression of increased depth-wise extension of the stereo image.

Thus, assuming appropriate dimensioning and calibration of the apparatus, an operator can automatically focus the camera objective on a subject by adjusting the focus control (actuator 94) until the subject appears to be located between the near and far limits of the projected stereo image. By this invention, the depth-wise extension of the stereo image is automatically adjusted to follow changes in the depth of field of the objective resulting from adjustments in the effective aperture thereof. Thus, in addtion to receiving a visual indication of proper focus the operator is also apprised of the depth of field of the camera objective, and, because the depth of field indication is projected into the viewed field, he can relate it to real objects which he observes.

The invention is not limited to the particular details of construction of the embodiments depicted, and it is contemplated that various and other modifications and applications will occur to those skilled in the art. Therefore, because certain changes may be made in the above-described apparatus without departing from the true spirit and scope of the invention herein involved, it is intended that the subject matter of the above depiction shall be interpreted as illustrative and not in a limiting sense.

What is claimed is:

1. A rangefinder comprising:
   a pair of stereoscopically related reticles, a left reticle for the left eye and a right reticle for the right eye, each of said reticles having at least two visibly discrete elements;
   means for projecting virtual images of said left and right reticles along left and right stereo axes substantially to a convergence point of said axes to define a stereo reticle image observable binocularly at said point of convergence of said axes, the angle of convergence of said axes being identifiable with the range of objects in an observed field which appear to be situated within the depth-wise extension of said stereo image; and
   adjustable means for effectively causing one of said reticle elements on at least one of said reticle to translate laterally relative to the other of said elements to effect an adjustment in the apparent separation between the stereo viewpoints represented by said left and right reticles and thereby to vary the apparent magnitude of said depth-wise extension of said stereo image.

2. The apparatus defined by claim 1 including means for physically moving said elements on at least one of said reticles relative to each other to produce said adjustment in the apparent separation between the stereo viewpoints represented by said left and right reticles, and wherein said adjustable means includes means coupled to said means for moving for selectively varying the relative position of said reticle elements.

3. A rangefinder comprising:
   a pair of stereoscopically related reticles, a left reticle for the left eye and a right reticle for the right eye, each of said reticles having at least two visibly discrete elements;
   means for projecting virtual images of said left and right reticles along left and right stereo axes substantially to a convergence point of said axes to define a stereo reticle image observable binocularly at said point of convergence of said axes;
   variable means for varying the convergence angle and thus the convergence point of said stereo axes and the image distances of said left and right reticle images correspondingly to cause said stereo image to move in a depth-wise direction in the viewed field, the setting of said variable means when an object in an observed field is apparently within the depth-wise extension of said stereo image being identifiable with the range of the object; and
   adjustable means for effectively causing one of said reticle elements on at least one of said reticles to translate laterally relative to the other of said elements to effect an adjustment in the apparent separation between the stereo viewpoints represented by said left and right reticles and thereby to vary the apparent magnitude of said depth-wise extension of said stereo image.

4. The apparatus defined by claim 3 including means for physically moving said elements on at least one of said reticles relative to each other to produce said adjustment in the apparent separation betwene the stereo viewpoints represented by said left and right reticles, and wherein said adjustable means includes means coupled to said means for moving for selectively varying the relativel position of said reticle elements.

5. In a photographic camera, the combination comprising:
   a variable focus objective lens and focus control means operable to change the focus of said lens;
   means defining a variable exposure aperture and aperture control means operable to vary the size of said aperture;
   a rangefinder comprising:
      a pair of stereoscopically related reticles, a left reticle for the left eye and a right reticle for the right eye, each of said reticles having at least two visibly discrete elements;
      means for projecting virtual images of said left and right reticles along left and right stereo axes substantially to a convergence point of said axes to define a stereo reticle image observable binocularly at said point of convergence of said axes,
      variable means for varying the convergence angle and thus the convergence point of said stereo axes and the image distances of said left and right reticle images correspondingly to cause said stereo image to move in a depth-wise direction in the viewed field, and
      adjustable means for effectively causing one of said reticle elements on at least one of said reticles to translate laterally relative to the other of said elements to effect an adjustment in the apparent separation between the stereo viewpoints represented by said left and right reticles and thereby to vary the apparent magnitude of said depth-wise extension of said stereo image;
   first coupling means for coupling said focus control means and said variable means such that adjustment of said focus control means until an object to be photographed appears to lie within the depth-wise extension of said stereo image causes said lens to be focused on the object; and
   second coupling means for coupling said aperture control means and said adjustable means such that adjustment of said aperture control means effectively causes the apparent magnitude of the depth-wise extension of said stereo image to vary in accordance with variations in the depth of field of said lens resulting from changes in the effective aperture thereof.

6. The apparatus defined by claim 5 including means for physically moving said elements on at least one of said reticles relative to each other to produce said adjustment in the apparent separation between the stereo viewpoints represented by said left and right reticles, and wherein said adjustble means includes means coupled to said means for moving for selectively varying the relative position of said reticle elements.

7. For use in determining appropriate focus and exposure settings of a photographic camera having a variable focus objective lens and avariable exposure aperture, a method for finding the range of objects in an observed field and for ascertaining which objects in a depth-wise distribution of objects are within the depth of field of the lens, comprising:

projecting virtual images of stereoscopically related left and right reticles having respectively at least two discrete elements along convergent left and right stereo axes substantially to the convergence point of said axes to define a stereo reticle image observable binocularly at said point of convergence of said axes;

varying the apparent image distance of said stereo image in corresponding with adjustments in the focus of said objective lens until the image appears to correspond generally in space with the location of objects whose range is to be determined; and in accordance with changes in the depth of field of said objective lens, effectively causing one of said reticle elements on at least one of said reticles to translate laterally relative to the other of said elements so as to vary the apparent separation between the stereo viewpoints represents by said left and right reticles and to thereby adjust the magnitude of the apparent depth-wise extension of said stereo image.

References Cited

UNITED STATES PATENTS

| | | | |
|---|---|---|---|
| 1,987,765 | 1/1935 | Wandersleb | 95—44 C |
| 2,407,306 | 9/1946 | Land | 356—12 |
| 2,918,855 | 12/1959 | Wilkenson | 95—44 C |

SAMUEL S. MATTHEWS, Primary Examiner

R. A. WINTERCORN, Assistant Examiner

U.S. Cl. X.R.

353—7; 356—12